United States Patent [19]

Briskman

[11] Patent Number: 5,278,863
[45] Date of Patent: Jan. 11, 1994

[54] RADIO FREQUENCY BROADCASTING SYSTEMS AND METHODS USING TWO LOW-COST GEOSYNCHRONOUS SATELLITES

[75] Inventor: Robert D. Briskman, Bethesda

[73] Assignee: CD Radio Incorporated, Washington, D.C.

[21] Appl. No.: 866,910

[22] Filed: Apr. 10, 1992

[51] Int. Cl.$^5$ .............................................. H04K 1/04
[52] U.S. Cl. .......................................................... 375/1
[58] Field of Search ............................ 375/1; 380/34; 455/12.1, 17.1, 13.2, 13.3, 13.4

[56] References Cited

U.S. PATENT DOCUMENTS

| | | |
|---|---|---|
| 4,291,409 | 9/1981 | Weinberg et al. ...................... 375/1 |
| 4,291,410 | 9/1981 | Caples et al. ............................ 375/1 |
| 4,532,635 | 7/1985 | Mangulis ................................. 375/1 |
| 4,652,884 | 3/1987 | Starker . |
| 5,073,900 | 12/1991 | Mallinckrodt ......................... 375/1 |
| 5,093,839 | 3/1992 | Kohno et al. .......................... 375/1 |
| 5,148,452 | 9/1992 | Kennedy et al. ..................... 375/1 |

*Primary Examiner*—Salvatore Cangialosi

[57] ABSTRACT

High quality audio broadcasts at radio frequencies to mobile receivers at or near the earth's surface are provided by substantially simultaneous transmission of the same signal from two geosynchronous, spatially-separated satellites on the geosynchronous orbit which virtually eliminates multipath fading and foliage attenuation and thereby permits the use of a low-cost space segment.

7 Claims, 7 Drawing Sheets

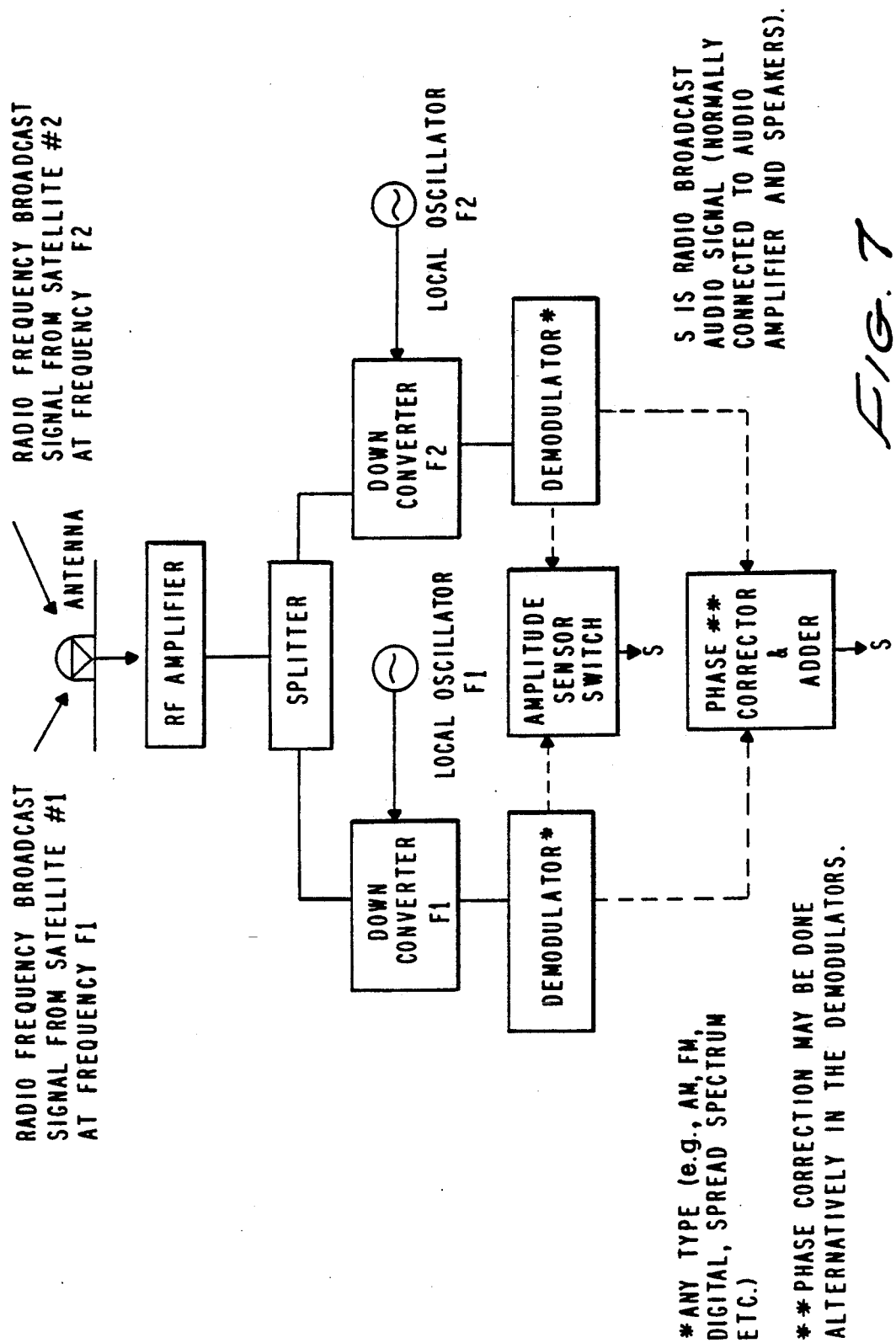

RADIO FREQUENCY BROADCASTING SYSTEMS AND METHODS USING TWO LOW-COST GEOSYNCHRONOUS SATELLITES

BACKGROUND OF THE INVENTION

Over the past several years, proposals have been made in the United States at the Federal Communications Commission (FCC) and, internationally, at the International Telecommunications Union (ITU) to broadcast radio programs from geosynchronous satellites to receivers in mobile platforms (e.g., automobiles) and in other transportable and fixed environments. Since geosynchronous satellites are located in near-equatorial orbits approximately 42,300 kilometers from the earth's surface, such satellites appear stationary to an observer on the ground. The satellite views roughly one-third of the earth's surface below it, which allows radio broadcast coverage of such a large area or, by using directional antennas on the satellite, a sub-area such as a particular country. This potential national coverage area of many tens of millions of square kilometers for providing radio service throughout the continental United States (or other country/region) is the main feature of satellite radio broadcasting, since normal terrestrial AM/FM radio stations typically cover a much smaller area.

Radio broadcasting from satellites involves use of special receivers in mobile or fixed platforms because of technical implementation and frequency allocation/interference requirements. Consequently, proposals for building such systems have generally used UHF frequencies in the range of about 300 to about 3,000 MHz. FIG. 1 shows a typical satellite radio broadcasting system. Additional satellites can be used with the satellite system shown in FIG. 1 for providing redundancy, additional channels or both. FIG. 1 shows the most important transmission path, the path from the satellite to the mobile or fixed platforms. Since a mobile platform requires an antenna which can receive satellite signals from all azimuths and most elevation angles, the mobile platform antenna gain must be low (e.g. 2-4 dBi gain is typical). For this reason, the satellite must radiate large amounts of radio frequency transmitter power so that the mobile platform receiver can receive an adequate signal level.

In addition to the need for a high power transmitter in the satellite is the need for extra transmitter power, called "transmission margin", to overcome multipath fading and attenuation from foliage. Multipath fading occurs where a signal from a satellite is received over two or more paths by a mobile platform receiver. One path is the direct line-of-sight or desired path. On other paths, the signal from the satellite is first reflected from the ground, buildings, or trucks, and then received by a mobile platform receiver, as FIG. 2 shows. These other paths are interfering in amounts that depend on factors such as losses incurred during reflection.

Among the methods for reducing multipath fading in radio systems, are the following:
1. Providing a second path for a desired signal between a transmitter and a receiver that is physically different from the first path for the signal. This is called space diversity, and is effective where only one of the two paths is strongly affected by multipath fading at any instant;
2. Providing a second transmission frequency for a desired signal between a transmitter and a receiver. This is called frequency diversity, and is effective where only one of the two frequencies is strongly affected by multipath fading at any instant; and
3. Providing signal modulation resistant to multipath fading such as spread spectrum. This method is effective where some resistance results from the large modulated frequency bandwidth used, and some resistance results from the receiver's rejection of an undesired signal's spreading code.

The transmission margin necessary to overcome multipath fading or attenuation from foliage has been both measured and estimated by experts to be in the range of about 9 to about 12 dB for satellite radio broadcast systems operating at UHF frequencies. Fortunately, multipath and attenuation from foliage seldom occur simultaneously. However, the need for 9-12 dB be increased by a factor of 8 to 12 over its initially high level. Radio broadcasting satellites operating at such power levels would be extremely large, complex and costly. To date, no commercial system of this kind is in use because of this high cost.

The systems and methods of this invention overcome these problems, by sending the same radio broadcast signals substantially simultaneously through two or more geosynchronous satellite sources separated by a sufficient number of degrees of orbital arc to minimize the effects of multipath fading and foliage attenuation, as FIG. 3 shows.

A receiver on a mobile or fixed platform receives the two signals through two physically distinct paths in space diversity methods, and selects the stronger signal, or combines the two signals. The signals can be at the same radio frequency using a modulation resistant to multipath interference, or at a different radio frequency, with or without a modulation resistant to multipath. Foliage attenuation is minimized because trees and other foliage are seldom in the line-of-sight to both satellites at the same time.

In preferred embodiments, these systems and methods provide radio broadcasts from geosynchronous satellites with one-eighth or less the power needed with a single satellite. Since satellite cost is directly proportional to satellite transmitting power, the radio broadcast satellite system of this invention uses satellites about one-eighth or less as costly and as heavy as single satellite systems. The reduced satellite mass also permits the use of a lower capability, lower cost launch vehicle. Even if two launch vehicles are needed, the satellite portions of the subject system are still only about 25% as costly as a single satellite transmission system.

The subject system substantially improves reception quality by eliminating many blockage outages. Blockage outages occur when physical objects such as buildings or hills lie in the line-of-sight between the satellite and the receiver. As FIG. 4 shows, such blockage seldom occurs simultaneously on both satellite paths. FIG. 4 also shows that signal attenuation from foliage is minimized, because such attenuation results from partial signal blockage.

SUMMARY OF THE INVENTION

This invention relates to a system of two or more satellites moving in spatially separated positions on substantially the same geosynchronous orbit, each sending or relaying, substantially simultaneously, preferably at UHF frequencies in the range of about 300 to about 3,000 MHz, the same radio broadcast signal to receivers at or near the earth's surface. The spatial separation of the satellites is sufficient to minimize multipath fading, foilage attenuation, or both. Preferably, the separation between any two satellites is in the range of about 25° to about 50°. These signals are preferably digitally modulated for high fidelity, but may also be analog.

BRIEF DESCRIPTION OF THE DRAWINGS

The systems and methods of this invention can better be understood by reference to the drawings, in which:

FIG. 7 shows a dual-frequency satellite radio broadcast receiver for use with the two-satellite broadcast system embodiment shown in FIGS. 3 and 4.

DESCRIPTION OF THE PREFERRED EMBODIMENTS

Figure 1:
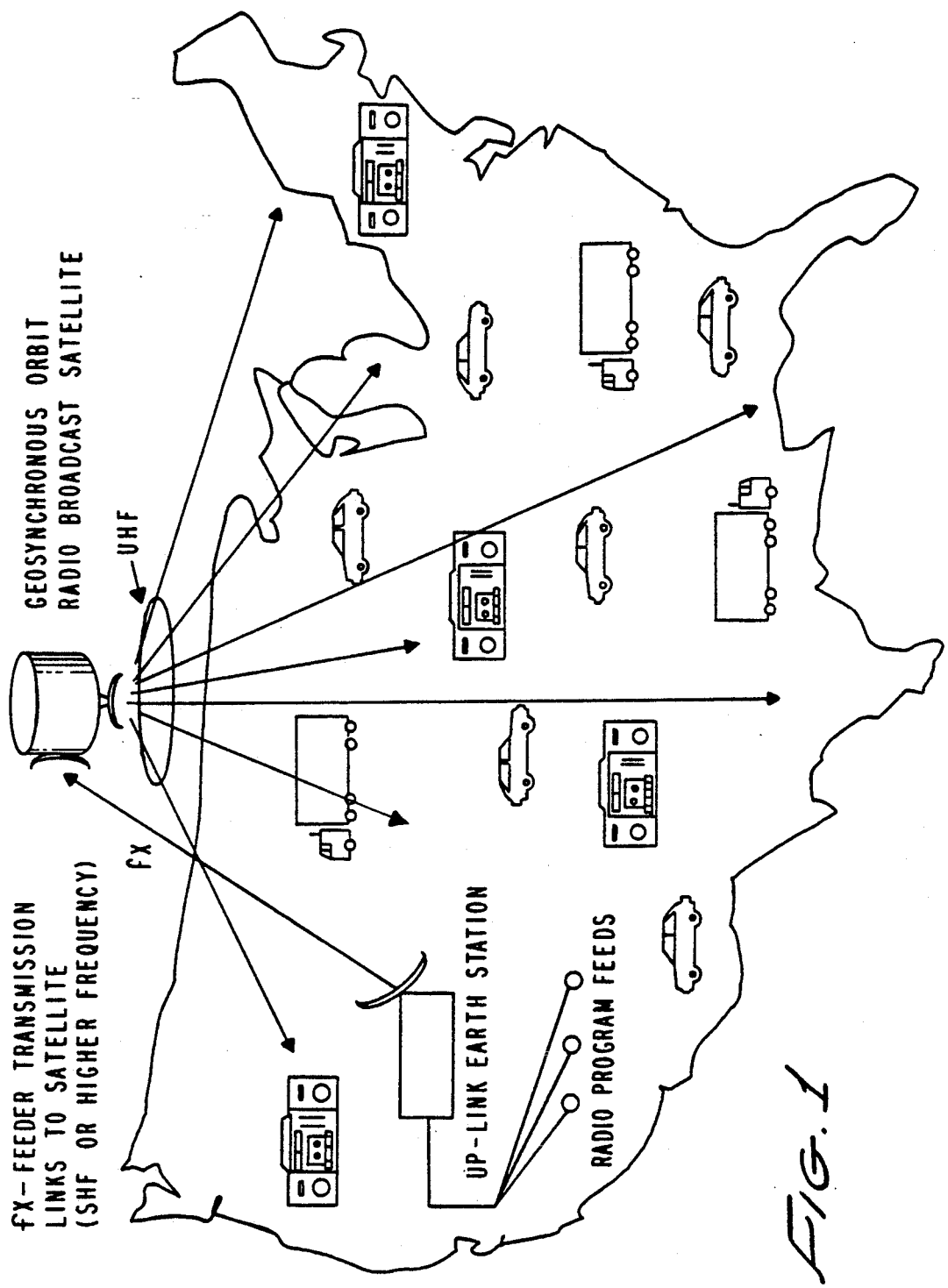
FIG. 1 shows a UHF radio broadcast satellite system utilizing a single satellite source.
Figure 2:
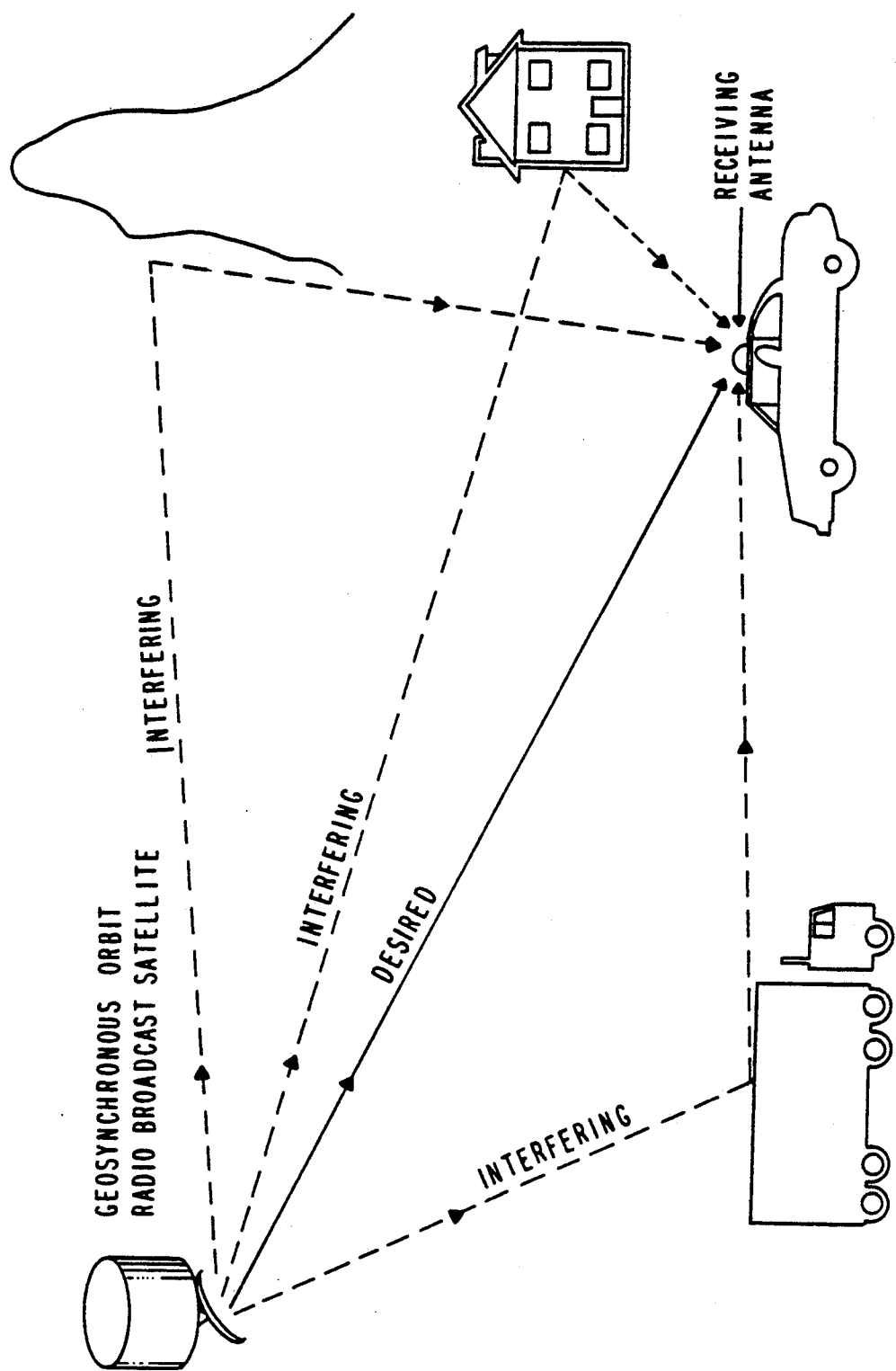
FIG. 2 shows multipath fading that occurs in UHF radio broadcasting from satellites.
Figure 3:
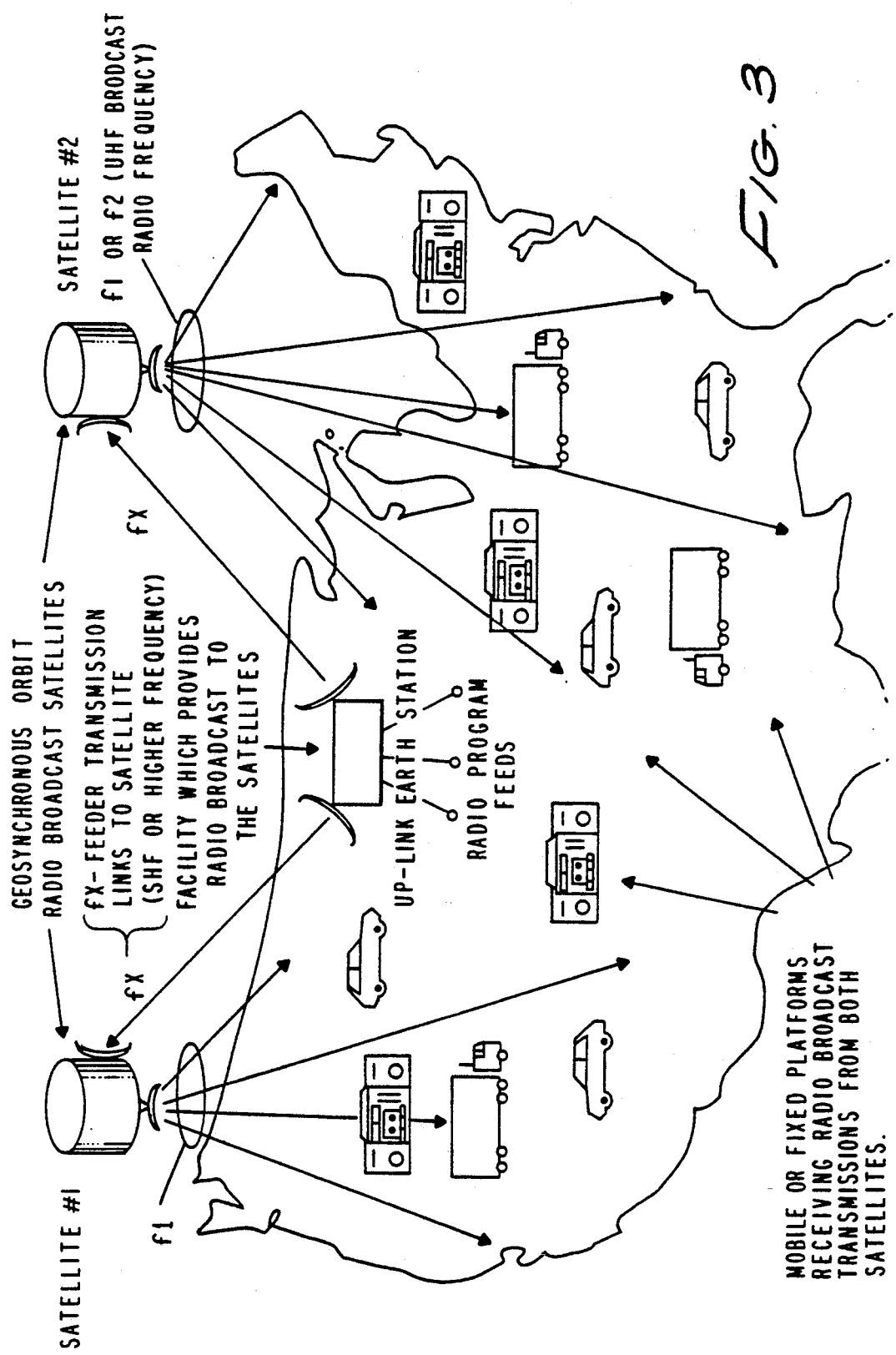
FIG. 3 shows an embodiment of the UHF radio frequency broadcasting system of this invention utilizing two spatially separated satellite sources on substantially the same geosynchronous orbit.
Figure 4:
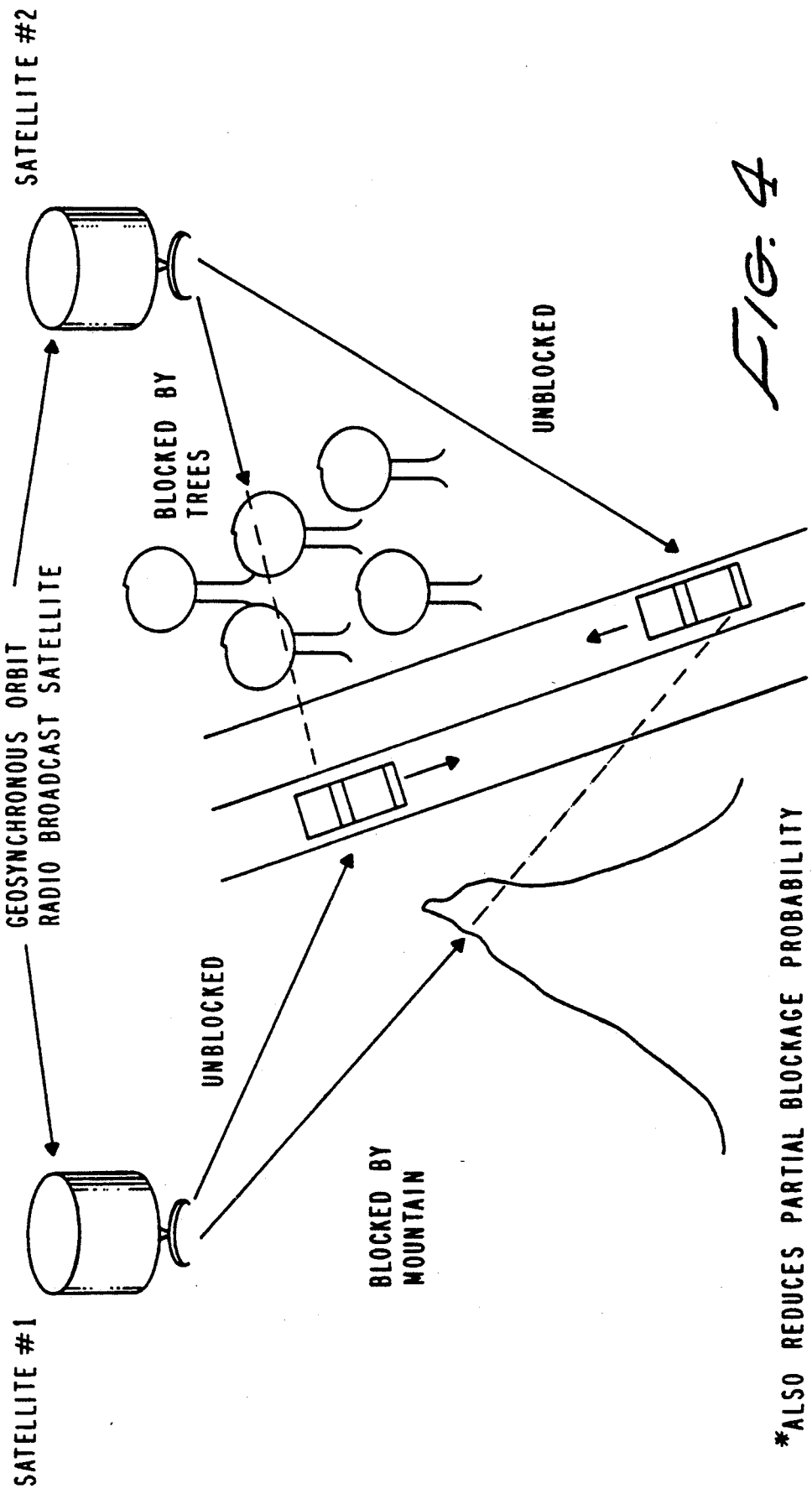
FIG. 4 illustrates the reductions in total and partial blockage outages attainable with the two-satellite system embodiment shown in FIG. 3.
Figure 5:
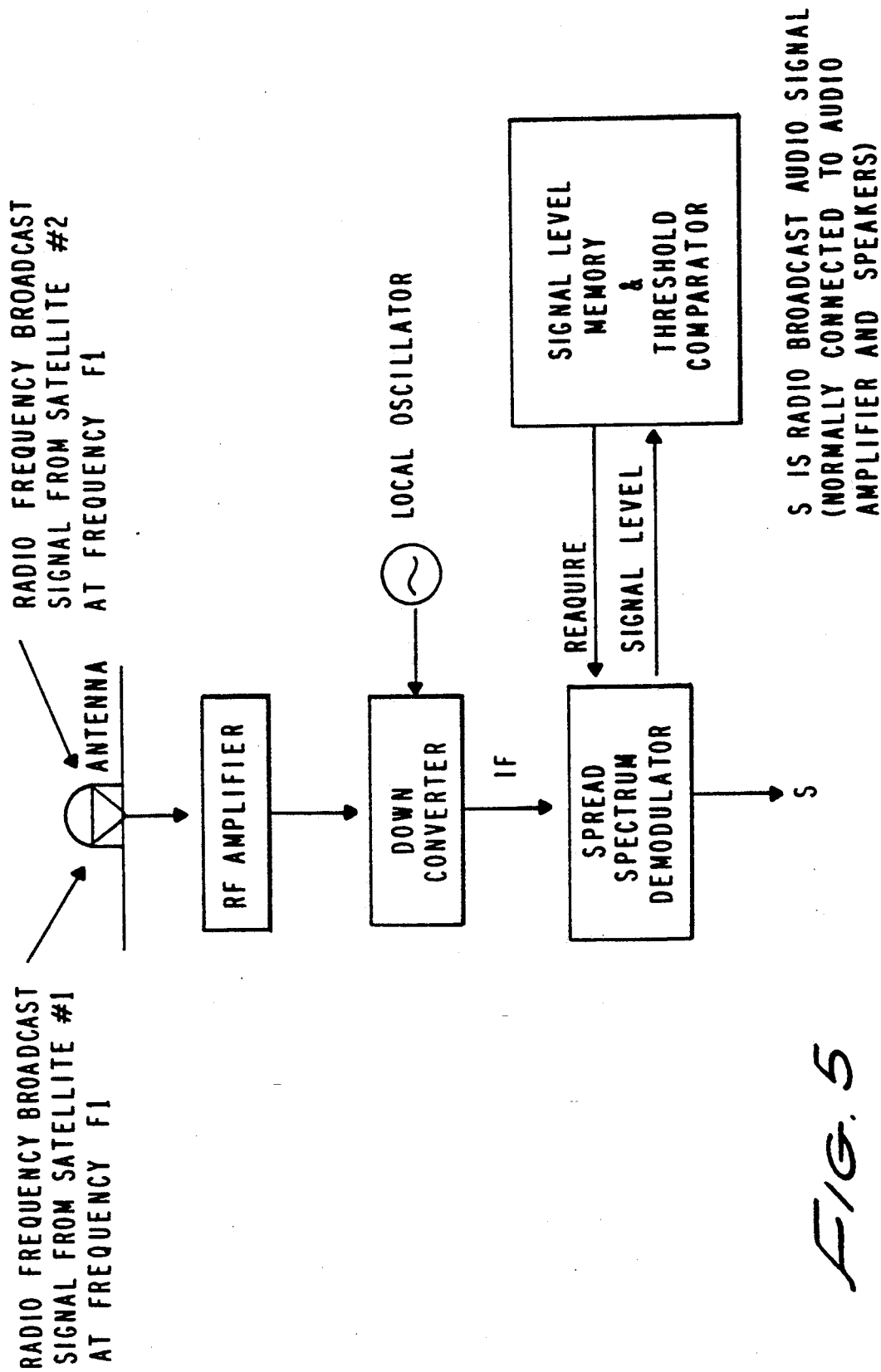
FIG. 5 shows a single correlator-type co-frequency satellite radio broadcast receiver for use with the two-satellite system embodiment shown in FIGS. 3 and 4.
Figure 6:
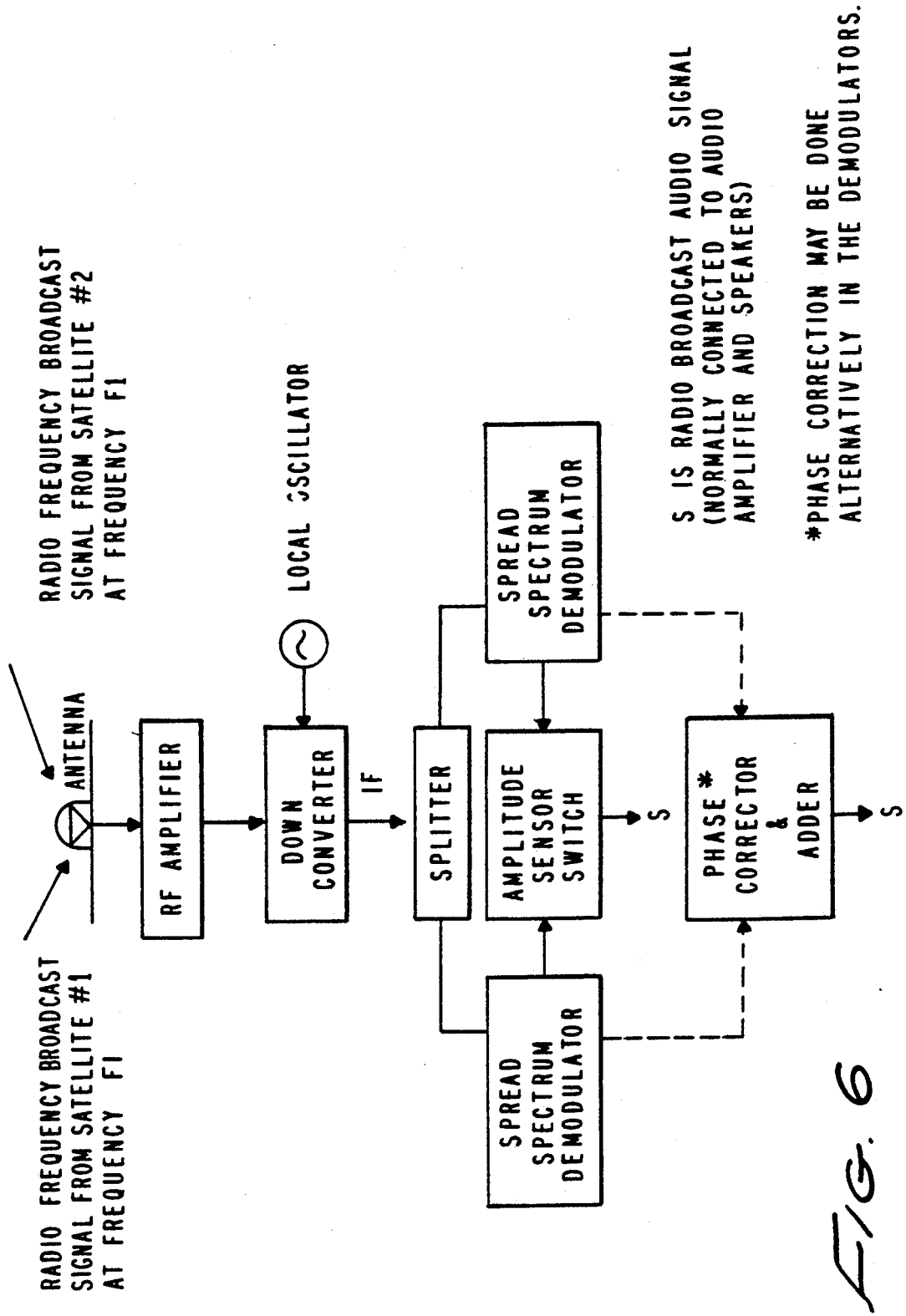
FIG. 6 shows a dual correlator-type co-frequency satellite radio broadcast receiver for use with the two-satellite system embodiment shown in FIGS. 3 and 4.

In the co-frequency embodiments of FIGS. 5 and 6, two satellites in substantially the same geosynchronous orbit send or relay substantially the same signal at substantially the same radio frequency. As a result, the receiver for the radio signals can be simple, and low in cost. The modulation method used preferably resists multipath interference and prevents mutual self-interference that would result in signal jamming. Methods such as spread spectrum modulation (e.g., direct sequence or frequency hopping) are preferably used to achieve Code Division Multiple Access (CDMA).

A preferred receiver for use in a mobile platform such as a vehicle is a standard, one-channel direct sequence spread spectrum detection device. This device is adapted to acquire the code of the signal from any of the satellites in the system. Preferably, this code is the same for the signals from both satellites, which is accomplished by having the satellites receive the radio signals to be transmitted to the mobile platform receiver from an up-link station on the earth's surface. Such an up-link station could delay one of the two codes in time to permit faster acquisition. In the mobile receiver, when the signal level drops a fixed, predetermined amount below a threshold value, such as an amount greater than 2 dB, a code loop is opened, and re-acquisition is performed on any signal stronger than the threshold value, as FIG. 5 shows in block diagram form.

In FIG. 5, the antenna receives the radio frequency signals from each of the two satellites. The signals are amplified by the radio frequency amplifier. The signals are changed from radio frequency to an intermediate frequency (IF) by the down converter. The specific intermediate frequency is chosen by the frequency of the local oscillator. One of the two signals is acquired and detected by the spread spectrum demodulator on a random basis and the other signal ignored. The signal level of the detected signal is sent to the Signal Level Memory and Threshold Comparator. The detected signal is then sent to an audio amplifier and loudspeakers for listening. The Signal Level Memory continuously receives the signal level of the detected signal and compares it with the previously sent values of signal level. When the current value of signal level falls a certain amount (i.e., to a preset threshold), the spread spectrum demodulator is forced to re-acquire a signal, and attempts to do so until a signal is re-acquired whose level is greater than the threshold level.

Alternatively, the receiver in the mobile platform can have common antenna, radio and intermediate frequency (IF) equipment. The IF feeds two correlators, each namely an independent spread spectrum code acquisition circuit and a detection circuit, as shown in FIG. 6.

In FIG. 6, the antenna receives the radio frequency signal from each of the two satellites. The signals are amplified by the radio frequency amplifier. The signals are changed from radio frequency to an intermediate frequency (IF) by the down converter. The specific intermediate frequency is chosen by the frequency of the local oscillator. The down converter output is split in half by the splitter, and presented to each spread spectrum demodulator. Each spread spectrum demodulator acquires recognized by either using a different code sequence for each signal, or by having an a priori time offset between the two signals' identical code sequence. Each spread spectrum demodulator sends the detected signal to either the Amplitude Sensor Switch, which outputs the stronger (higher level) one to an audio amplifier and loudspeakers for listening, or to the Phase Corrector and Adder, which shifts the signals so they are in phase with each other and then sums them. The sum is outputted to an audio amplifier and loudspeakers for listening. Alternatively, the phase correction can be accomplished in the Spread Spectrum Demodulators. The codes of the signals from the satellites can be substantially identical, but offset in time or orthogonal to one another, as are Gold codes. Each of the detected signals is derived from the correlators. The signals can then be selected individually, or combined with one another to produce a single, summed output signal.

The receiver preferably outputs a signal by one of two methods. The simpler method compares the amplitudes of the signals from the two satellite sources, and chooses the stronger signal for output. Alternatively, the phases of the two signals are adjusted until they are identical to one another. The two signals are then summed to produce an output signal. This method avoids switching the receiver from one signal to another, and provides better quality signals when the transmission paths of the two signals are unaffected, or are only partially attenuated by multipath fading or foliage. The previously mentioned phase adjustments are necessary because, although both satellite sources send substantially the same signal at substantially the same time, these signals reach the mobile platform receiver with different phases since the platforms are generally at a different distance from each satellite.

In the dual-frequency embodiments, both satellites send or relay substantially the same broadcast signal, but at two substantially different frequencies. These embodiments achieve less multipath fading because both space and frequency diversity are attained simultaneously. These embodiments further permit the use of multipath resistant modulation. However, the receiver is more complex. As FIG. 7 shows, such a receiver includes two down converters, intermediate frequency amplifiers and demodulator circuits. In FIG. 7, the antenna receives the radio frequency signal from each of the two satellites. The signals are amplified by the radio frequency amplifier. The radio frequency amplifier output is split in half by the Splitter and presented to each down converter. The signals are changed from radio frequency to an intermediate frequency (IF) by the down converters. The local oscillators are set to the proper frequencies so that the signal frequencies $F_1$ and $F_2$ are converted to the same IF. The IF from the down converters feeds the demodulators. The demodulators remove the signal modulation, and send the detected signals to either the Amplitude Sensor Switch, which outputs the stronger (higher level) one to an audio amplifier and loudspeakers for listening, or to the Phase Corrector and Adder, which shifts the signals so they are in phase with each other and then sums them. The sum is outputted to an audio amplifier and loudspeakers for listening. Alternatively, the phase correction can be accomplished in the demodulators.

Dual-frequency embodiments can be as shown in FIG. 7, or can be of a type which switches rapidly between the frequencies of the two signals, or can utilize digital signal processing. The output signals from the receiver can be selected by comparing the amplitudes of the two input signals, and using the stronger signal, or the input signals can be adjusted to the same phase and summed to produce an output signal.

What is claimed is:

1. A method for reducing multi-path fading in a radio broadcasting system adapted to broadcast signals having frequencies in the range of about 300 MHz to about 3,000 MHz comprising:

broadcasting a first signal using spread spectrum modulation from a first satellite source traveling on a geosynchronous orbit;

substantially simultaneously broadcasting a second signal using spread spectrum modulation, said second signal having substantially the same content and frequency as said first signal from a second satellite source on said geosynchronous orbit, said second satellite source being spaced from said first satellite source a predetermined number of degrees to reduce multi-path fading and to reduce signal attenuation from physical objects in the paths of said first signal and said second signal and producing an output signal from said first signal and said second signal at a plurality of fixed receivers and a plurality of mobile receivers located at or near the surface of the earth.

2. The method of claim 1 further comprising measuring the signal strengths of said first and said second signals, and selecting the stronger signal from said first and said second signals.

3. The method of claim 1 further comprising combining said first and said second signals to form said output signal.

4. The method of claim 1 wherein said first and said second signals are modulated sufficiently to resist multi-path fading.

5. The method of claim 2 wherein said first and said second signals are modulated sufficiently to resist multi-path fading.

6. The method of claim 3 wherein said first and said second signals are modulated sufficiently to resist multi-path fading.

7. The method of claim 1 or claim 2 or claim 3 or claim 4 or claim 5 or claim 6 wherein said predetermined number of degrees is in the range of about 25 degrees to about 50 degrees.

* * * * *